Aug. 1, 1967   P. H. MITCHELL   3,333,933
BUSHING ASSEMBLY FOR FORMING GLASS FIBERS
Filed Jan. 13, 1965

INVENTOR
PAUL H. MITCHELL

BY   Chisholm and Spencer

ATTORNEYS 3,333,933
BUSHING ASSEMBLY FOR FORMING
GLASS FIBERS
Paul H. Mitchell, Shelbyville, Ind., assignor to Pittsburgh Plate Glass Company, Pittsburgh, Pa., a corporation of Pennsylvania
Filed Jan. 13, 1965, Ser. No. 425,232
5 Claims. (Cl. 65—12)

ABSTRACT OF THE DISCLOSURE

A melting chamber in a glass strand forming machine associated with a source of hot gas for making short fibers from the strand in which the chamber has openings in the bottom thereof or in bushings attached to the bottom, and heat reflecting members adjacent the openings for reflecting heat onto the glass discharged from the openings to lower the viscosity thereof.

---

This invention relates to an improved apparatus for producing vitreous fibers and in particular to a bushing unit for producing glass fibers.

The usual bushing for producing glass fibers has consisted of a container, generally of a platinum-rhodium alloy, having a plurality of tips on the lower surface which are connected to and open into the container. The container holds a quantity of molten glass, and molten glass is discharged therefrom through the tips. The glass forms cones from which the fibers are drawn.

Because of the large number of tips, there is a temperature differential between the end tips and the tips adjacent to the end tips. Also, local temperature differentials may exist between other adjacent tips. The temperature differentials lead to the production of different diameter fibers from adjacent tips whereas a uniform or substantially uniform product is desired.

It has been found that the above and other nonuniform temperature conditions can be virtually eliminated by constructing the bushing unit so that heat is reflected from the bushing onto the cones of glass at the tips. As before, a platinum-rhodium alloy is preferred. Such a unit is self-contained and has no parts which require adjustment of position or which will interfere in any way with the process.

Figure 1:
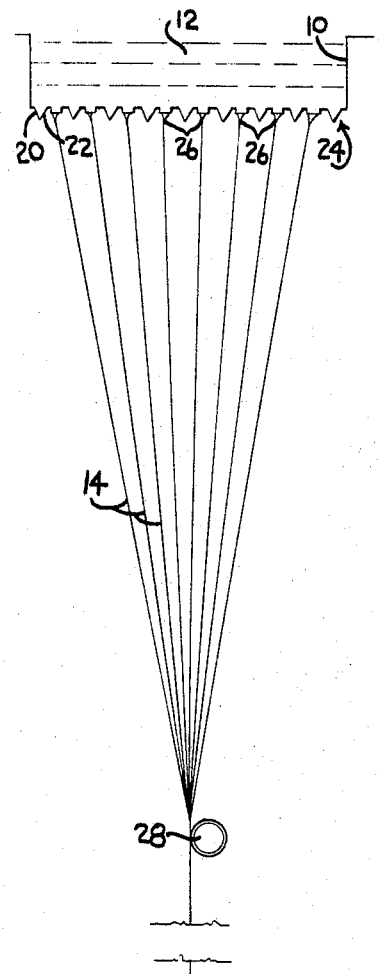
Figure 2:
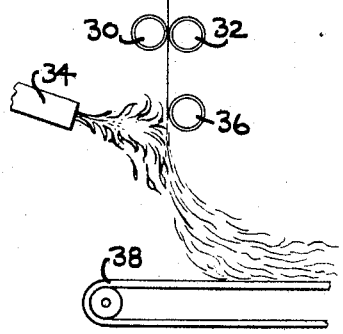

For a more complete description of a bushing constructed according to this invention, attention is now directed to the accompanying drawings, in which:

FIG. 1 is a side view of the general arrangement for producing primary fibers and fibrous products and illustrating the bushing construction of the present invention; and FIG. 2 is a perspective view, with parts broken away, illustrating in greater detail the bushing construction of this invention.

Turning now to the drawings, the bushing is shown as a container and is generally identified as 10. The bushing contains a mass of molten glass 12 from which primary fibers 14 are drawn through a plurality of tips 16, usually in rows, on the lower surface of the bushing. The tips 16 are preferably right circular cylindrical sections and are connected, as by welding, to horizontal sections 18 of the bushing 10. The bushing 10 has angled parts 20 and 22 which are joined, as by welding, to each other and to the horizontal sections 18, so as to form depending angled assemblies 24 interposed between the rows of bushing tips 16. Generally the tips 16 extend to about half the distance of the angled assemblies; however, their extent is not critical. They may be openings in the sections 18.

Molten glass is discharged through each tip 16 and forms a cone 26 from which a fiber 14 is drawn. The fibers 14 are grouped into a lateral plane and are guided by a roll 28 which maintains a desired spacing between the fibers. The fibers 14 are then fed between feeding rolls 30 and 32 into a hot gaseous blast from a burner 34. The fibers are anchored by a small roll 36 below the feeding rolls. The fibers 14 are softened by the hot gases and are attenuated into small diameter fibers which are collected, as a mat or blanket, on a foraminous conveyor 38.

The angled assemblies 24 are so constructed to reflect heat radiated by the cones of glass 26 back to the cones of glass and cause the temperature below the bushing to become equalized around all the tips. Thus the angle between the parts of the assemblies is acute and opens into the container. Uniformity in temperature produces uniform fibers 14 and results in a more uniform end product. Also, the temperature of the glass within the bushing is stabilized, so as to be unaffected by changes in the surrounding ambient temperature.

The above description has been directed to the production of primary fibers and a fibrous product by attenuating the primary fibers. It is to be understood that the bushing could be used in the strand process wherein a plurality of fibers are drawn from cones of glass, grouped into a strand, usually with the application of a binder, and then collected on a winder. The strand product is useful in fabric manufacture, etc. In such strand process, uniformity of individual fibers is very desirable. The bushing unit described provides the means to attain such uniformity of product.

I claim:

1. In apparatus for producing vitreous fibers including a bushing assembly having openings through which vitreous material flows and forms cones from which fibers are drawn, the improvement which comprises, self contained means for reflecting heat radiated by said cones back to said cones, said means including angled portions of the bushing assembly.

2. In apparatus for producing vitreous fibers including a bushing assembly having rows of openings and circular hollow tips attached at said openings through which vitreous material flows and forms cones from which fibers are drawn, the improvement which comprises, self contained means for reflecting heat radiated by said cones back to said cones, said means being disposed between rows of tips and including angled portions of the bushing assembly.

3. A bushing for producing glass fibers comprising, side walls and a bottom wall forming a container for molten glass, rows of openings in said bottom wall for discharging molten glass, and reflective means forming part of said bottom wall for reflecting heat radiated by discharging glass back to said discharging glass said reflective means being disposed between said rows of openings.

4. A bushing for producing glass fibers comprising side walls and a bottom wall forming a container for molten glass, said bottom wall including joined sections forming horizontal portions separated by reflective depending acute angled portions which open into said container, and rows of openings through said horizontal portions adjacent said acute angled portions for the discharge of glass from said container.

5. A bushing for producing glass fibers comprising side walls and a bottom wall forming a container for molten glass, said bottom wall including joined sections forming horizontal portions separated by reflective depending acute angled portions which open into said container, rows of openings through said horizontal portions, and cylindrical tips adjacent said angled portions joined to each opening for the discharge of glass from said container.

References Cited
UNITED STATES PATENTS

| | | |
|---|---|---|
| 2,714,622 | 8/1955 | McMullen. |
| 2,814,657 | 11/1957 | Labino. |
| 3,002,226 | 10/1961 | Warthen _____ 65—1 X |
| 3,009,199 | 11/1961 | Plummer _____ 65—12 X |
| 3,068,670 | 12/1962 | Russell _____ 65—12 |

DONALL H. SYLVESTER, *Primary Examiner.*

R. L. LINDSAY, *Assistant Examiner.*